(12) United States Patent
List et al.

(10) Patent No.: US 7,744,155 B2
(45) Date of Patent: Jun. 29, 2010

(54) PROTECTION SYSTEM

(75) Inventors: Hans-Jörg List, Friedrichshafen (DE);
Uwe Fehr, Friedrichshafen (DE);
Kai-Uwe Keller, Kreuzlingen (CH);
Michael Bieniek, Tägerwilen (CH)

(73) Assignee: Mowag GmbH, Kreuzlingen (CH)

( * ) Notice: Subject to any disclaimer, the term of this patent is extended or adjusted under 35 U.S.C. 154(b) by 0 days.

(21) Appl. No.: 12/190,204

(22) Filed: Aug. 12, 2008

(65) Prior Publication Data
US 2009/0045659 A1   Feb. 19, 2009

(30) Foreign Application Priority Data
Aug. 13, 2007   (CH) .................................... 1282/07

(51) Int. Cl.
*B60N 2/42* (2006.01)
(52) U.S. Cl. ............................. 297/216.17; 297/344.19; 244/122 R
(58) Field of Classification Search ............ 297/216.16, 297/216.17, 216.19, 344.14, 344.16, 344.19; 244/122 R; 296/68.1
See application file for complete search history.

(56) References Cited
U.S. PATENT DOCUMENTS

| | | | | |
|---|---|---|---|---|
| 3,985,388 A | * | 10/1976 | Hogan .................... | 297/216.17 |
| 4,525,010 A | * | 6/1985 | Trickey et al. ......... | 297/216.17 |
| 5,125,598 A | * | 6/1992 | Fox ....................... | 244/122 R X |
| 5,273,240 A | * | 12/1993 | Sharon ................... | 244/122 R |
| 6,267,440 B1 | * | 7/2001 | Hoffman ................. | 297/216.1 |
| 6,582,015 B2 | * | 6/2003 | Jessup et al. ........... | 297/216.17 |

* cited by examiner

*Primary Examiner*—Anthony D Barfield
(74) *Attorney, Agent, or Firm*—Ladas and Parry LLP

(57) ABSTRACT

The protection system is used especially for the protection against a fatal effect of vertical accelerations triggered by a landmine on the passengers of an armored vehicle. For this, the sitting unit consisting of a seat body (7) and a backrest (8) is held movable in vertical direction and is coupled with an end area (15) of a longitudinally variable damping device (11), whose other end (13) is connected to the roof (4) of the vehicle (2) through a carrying equipment (6). In addition, the sitting unit is carried with vertical distance from the vertical guide (18) in a lower guide path (19) transversally directed so that the sitting unit executes both a downward as well as a tilting movement relative to the vehicle together with a passenger (3) during loading through vertical acceleration. In this way, an improved usage of the constructively limited effective length of the damping device (11) occurs so that the effect of the protection system is essentially improved. It is sensible to apply the same principle for the protection of all objects, which must be protected against the reaching or exceeding of a maximum load due to a too large acceleration or deceleration.

6 Claims, 1 Drawing Sheet

PROTECTION SYSTEM

Figure 1:
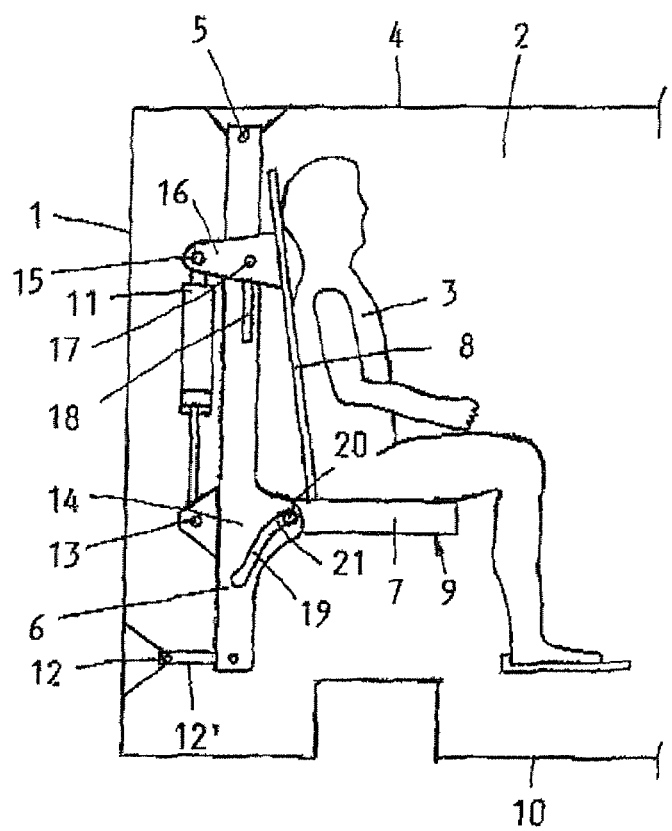

The invention concerns a protection system against a fatal effect of vertical accelerations on an object, especially on a person, held supported in a cabin in which a supporting unit provided for this, having a supporting surface for the object, is held movable by means of a vertical guide and is coupled to a longitudinally variable damping device, which is connected to the wall of the cabin through a carrying equipment, in which the supporting unit is held transversally movable in a transversal guide in addition to its guidance in the vertical guide.

For sifting equipments in armoured vehicles and for aircraft ejection seats, it is known in the art to carry the seat, including its backrest, movable longitudinally in a carrying equipment and to brake this longitudinal movement during mine impact or actuation of the ejection seat by means of a longitudinally variable damping device in order to limit the acceleration forces acting on the spinal column of the person using the seat to a non-fatal amount. Due to the restriction of the possible overall length of the damping device by the surrounding space and the required limitation of the acceleration forces acting on the person, these types of protection systems are not sufficient, e.g., against mines with large explosive force and/or small vehicles, with corresponding fatal consequences for the passengers. Moreover, in the case of the known protection systems, the damping device varying in its length starts functioning already before the acceleration forces on the object to be protected or on the spinal column of a person reaching a still not yet critical degree since the inertia of the supporting unit is already sufficient to activate such a damping system. A system with these features has been published e.g. by US 2002/0021041.

The invention is based on the task to avoid this disadbantage and consequently to find a protection system that is effective even for vertical accelerations of an armoured vehicle, because till now the loading capacity limit of the passengers was exceeded due to the limited availability of the damping path.

The problem is solved by a protection system of the type according to the invention mentioned at the beginning by the fact that the vertical guide and the transversal guide are vertically offset from each other in the carrying equipment so that the supporting unit executes both a downward movement as well as a tilting movement during loading through vertical acceleration of the cabin relative to this, in which the carrying equipment is connected to its roof structure, so that a vertical acceleration acting on the floor area of the cabin and transmitted to its roof structure is transmitted from this to the carrying equipment.

It is understood that in this connection the term "vertical" is not to be understood in the restricted sense of perpendicular but has the meaning "from above to below" in relation to the cabin containing the object, just like a vertical acceleration due to the action of a landmine, e.g., on a vehicle travelling uphill is not be considered as topographically exact.

Figure 2:
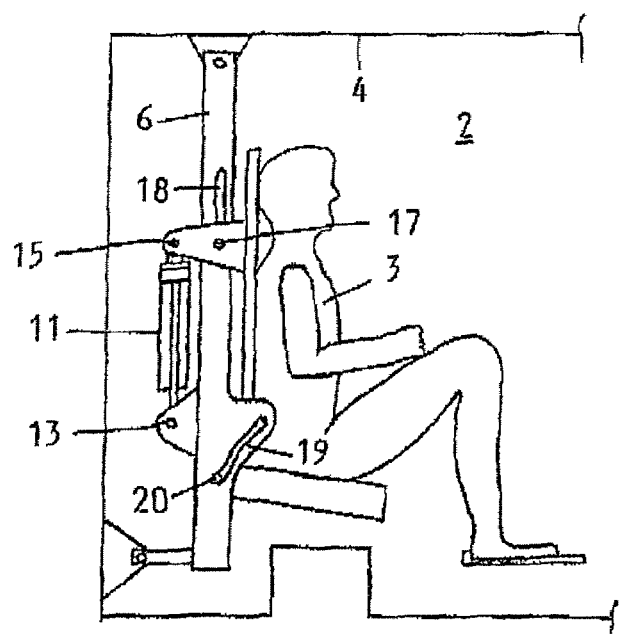

Favourable embodiments of the invention are the subject of the dependent patent claims and can be taken from the following description based on a schematically represented embodiment. The figures show:

FIG. 1 a side view of a protection system with the object to be protected and a partial representation of the related cabin in a starting position of the load and FIG. 2 a representation corresponding to FIG. 1 in an end position of the load.

Several protection systems of the type according to the invention are provided, for example, next to each other along a side wall 1 of the passenger cabin 2 of a vehicle armoured against the action of landmines. Each protection system for 3 passengers has minimum one carrying equipment 6 stretching lengthwise parallel to the side wall 1 and fixed to a roof structure 4 of the vehicle, preferably through the hinge 5, so that the sitting equipment 9 consisting of a sitting device 7 and a sitting backrest 8 and having safety belts is fixed in a hanging position at a distance from the floorboard 10 of the vehicle. A second hinge 12 with a side bracket 12' serves for the additional sideways holding of the carrying equipment 6 so that this can follow without deformation a distance variation between the two hinges 5 and 11 or between the floorboard 10 and the roof structure 4 occurring during mine impact.

This type of fixing has, in comparison to the protection systems supported on the vehicle floor, the essential advantage of a considerable reduction of acceleration energy due to a mine acting from the vehicle floor, because this propagates indirectly through the vehicle side wall 1 up to the roof structure 4 and with that to the carrying equipment 6 and finally through a damping device 11 to the vehicle seat and the vehicle passenger 3.

The damping device 11 is fixed at its lower end with a hinge 13 to a lower area 14 of the carrying equipment 6, while its upper movable end which is dampened in the direction of its lower end is connected to a bracket unit 16 carrying the sitting equipment 9 with a hinge 15.

In order to enable this damping movement, a slider-block guide 18, e.g., running in its longitudinal direction is provided for an, e.g., axle 17 of the bracket unit 16 supported in a slider in the carrying equipment 6 as vertical guide. Consequently, the sitting equipment 9 can execute a withdrawal movement directed vertically downwards and braked by the damping device 11 relative to the carrying equipment 6 starting from the position represented in FIG. 1 during the fast upward movement of the passenger cabin 2.

In order to initiate this relative vertical movement which is braked by the damping device 11 only just before reaching a load that is still compatible enough for the passengers or the concerned passenger 3, a characteristic of the damping device 11 suitable for this is provided on one hand and on the other hand a specific path characteristic for a lower guideway 19 directed away backwards relative to the sitting equipment 9 for a lower seat support 20 permitting a swinging of the seat directed backwards.

Corresponding to the course of this guideway 19 represented as example, this can be executed relatively flat in the beginning, i.e. in its upper area 21, afterwards steep and at the end again flat. However, it is essential for this that the characteristics of the damping device 11 and the guideway 19 must be exactly matching with each other under consideration of the geometrical specifications of the seat in order to achieve a maximum reduction of the necessary vertical traverse path of the damping device 11. Thereby, variable force components arise, which on one hand act on the sitting equipment 9 and the passenger 3 and on the other hand act on the damping device 11 so that the damping device 11 can dampen adequately large vertical accelerations of the vehicle due to the explosion of a landmine during the damping path which is constructively available to it than would be possible without such force division.

It is understood that the introduction of an additional swinging movement and consequent withdrawal movement directed backwards to the mass consisting of the sitting equipment 9 and the passenger 3 to be braked through the damping device 11 can take place also otherwise than through a slider-block type guide with a guide path 19 of the represented type, e.g., by means of a set of levers. Also, a transversal guide of the mass to be braked can be arranged other than that corresponding to the represented embodiment, just as damping devices are deployable executed differently or also additionally matched.

A protection system of the type described can also be used for the protection of objects of another type in a suitable embodiment, so that the seat unit 7 can be executed generally as supporting unit, e.g., for the receiving of objects, on which large accelerations can likewise act fatally, e.g., on explosive material or, e.g., objects containing highly sensitive electronics.

The invention claimed is:

1. A protection system against a fatal effect of vertical accelerations on an object which is supported in a cabin (2), or on a person (3), in which a supporting unit (7) provided for this, having a supporting surface for the object (3), is held movable by means of a vertical running guide (18) and is coupled to a longitudinally variable damping device (11), which is connected to a wall (4) of the cabin (2) through a carrying equipment (6), in which the supporting unit (7) is held transversally movable in a transversal guide (19) in addition to its guidance in the vertical running guide (18), wherein the vertical running guide (18) and the transversal guide (19) are provided with vertical offset from each other in the carrying equipment (6) so that the supporting unit (7) executes both a downward as well as a tilting movement relative to this during loading through vertical acceleration of the cabin (2), in which the carrying equipment (6) is connected to its roof structure (4), so that a vertical acceleration acting on the floor area (10) of the cabin (2) and transmitted to its roof structure (4) is transmitted from this to the carrying equipment (6).

2. The protection system according to claim 1, wherein the supporting unit is formed as a sitting platform (7) and is connected to a backrest (8), in which the sitting platform (7) is connected to an upper, vertically movable end (15) of the damping device (11) through the backrest (8) while the other end (13) of the damping device (11) is connected firmly to the carrying equipment (6).

3. The protection system according to claim 2, wherein an upper area of the backrest (8) is connected to the upper, vertically movable end (15) of the damping device (11) through a bracket unit (16), to which a unit (17) is fixed, which is guided in the vertical running guide (18) of the carrying equipment (6), in which the sitting platform (7) is connected to the carrying equipment (6) additionally through the guide (19) running acutely angled to the vertical so that the object (3) in the cabin (2) executes a dampened, relatively withdrawal movement directed downwards and tilting backwards in the lower area during vertical acceleration of the room (2) directed upwards.

4. The protection system according to claim 3, wherein the guide (19) has a curved course, a least in sections, matching a damping characteristic of the damping device (11).

5. The protection system according to claim 3, wherein the guide (19) has a flat s-shaped course with a relatively flat initial course.

6. The protection system according to claim 1, wherein the damping device (11) has a characteristic, by which its change of length and consequently its damping effect is initiated only after reaching a force, which corresponds at least approximately to the maximum compatible compressive load of the spinal column of the person to be protected or the maximum load in the corresponding load direction of the object to be protected.

* * * * *